United States Patent [19]

Abildgaard et al.

[11] Patent Number: 4,833,958

[45] Date of Patent: May 30, 1989

[54] PAPER PUNCHING MACHINE

[75] Inventors: William H. Abildgaard, Redwood City; Dale Ransom; Phillip M. Crudo, both of San Jose, all of Calif.

[73] Assignee: VeloBind, Inc., Fremont, Calif.

[21] Appl. No.: 135,494

[22] Filed: Dec. 21, 1987

Related U.S. Application Data

[63] Continuation of Ser. No. 942,365, Dec. 16, 1986, abandoned.

[51] Int. Cl.$^4$ .......................... B26F 1/02; B65G 59/00

[52] U.S. Cl. .......................................... 83/154; 83/165; 83/417; 83/687; 83/691; 414/798.9

[58] Field of Search ................. 83/165, 151, 153, 154, 83/112, 81, 82, 417, 691, 687; 412/37, 40, 42, 43; 414/114, 115, 330; 270/53

[56] References Cited

U.S. PATENT DOCUMENTS

| | | | |
|---|---|---|---|
| 2,641,321 | 6/1953 | Cruzan | 83/158 |
| 2,935,752 | 5/1960 | Rowley | 412/40 |
| 3,273,438 | 9/1966 | Brook | 83/685 |
| 3,921,487 | 11/1975 | Otsuka et al. | 83/632 |
| 3,964,672 | 6/1976 | Aylsworth et al. | 83/417 X |
| 4,077,288 | 3/1978 | Holland | 83/146 |
| 4,078,672 | 3/1978 | Crepaldi et al. | 414/330 |
| 4,119,221 | 10/1978 | Hazard | 414/114 |
| 4,157,821 | 6/1979 | Fabrig | 270/53 |
| 4,613,268 | 9/1986 | Capdeboscq et al. | 414/114 |

*Primary Examiner*—Donald R. Schran
*Attorney, Agent, or Firm*—Julian Caplan

[57] ABSTRACT

A machine for punching holes in batches of sheets has a receptor which holds a stack of sheets in vertical position. A timing mechanism sequentially jogs and segregates a first batch from the receptor and deposits same in a vertical punch slot. At the bottom of the punch slot is a horizontally reciprocating punch which forms the holes. Meanwhile, a second batch is being jogged and segregated. The first and second batches are gripped and lifted. The first batch is deposited in a vertical discharge slot from which it is transferred to a deposit tray. The second batch is simultaneously punched while in the punch slot.

14 Claims, 12 Drawing Sheets

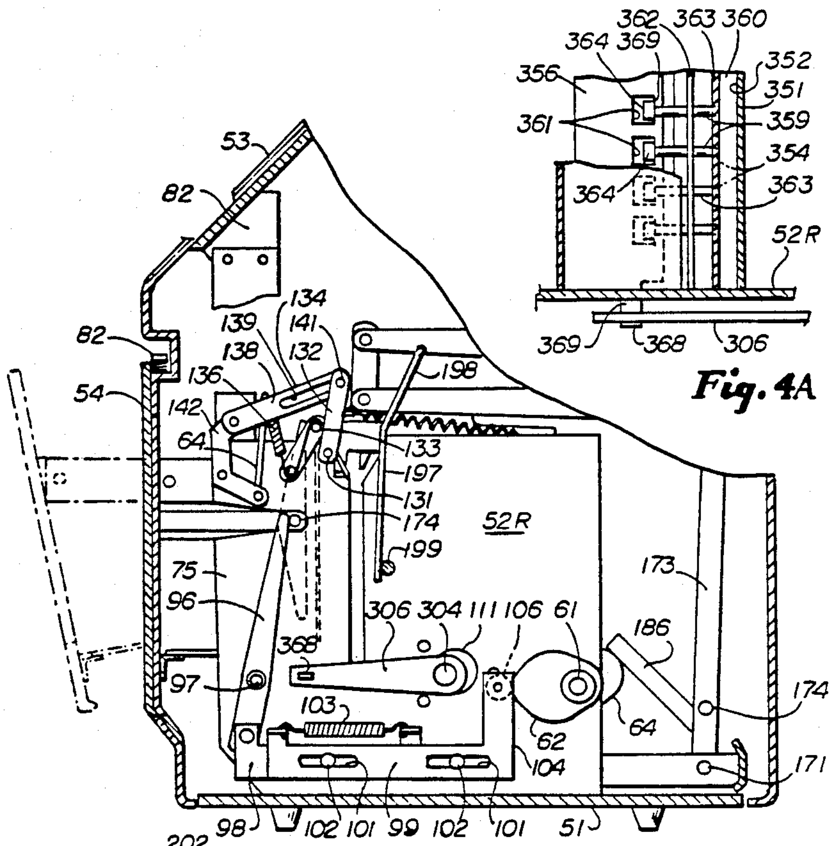
Fig. 4A
Fig. 2
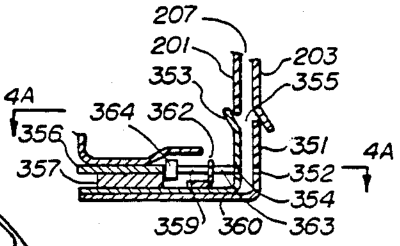
Fig. 4
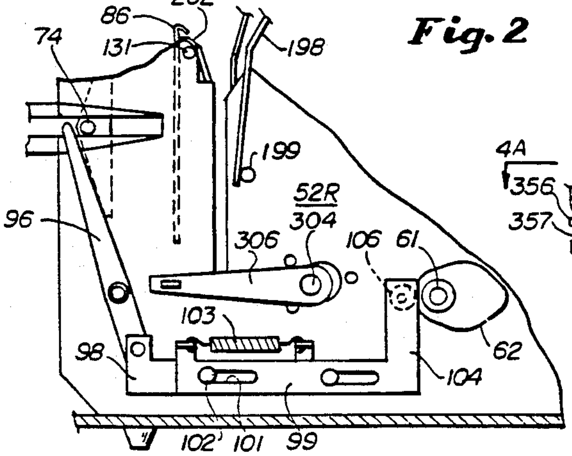
Fig. 3

PAPER PUNCHING MACHINE

This is a continuation of application Ser. No. 942,365 filed Dec. 16, 1986 now abandoned.

BACKGROUND OF THE INVENTION

1. Field of the Invention

This invention relates to a new and improved paper punch used to punch a vertically disposed stack of sheets to provide holes spaced along the lower marginal edge of the stack. More particularly, the invention is characterized by the fact that batches of any number of sheets up to whatever number can be accommodated by the punch are segregated from the stack, each batch being separately punched and then removed and discharged into a tray until the entire punched stack has been accumulated.

2. Description of Related Art

Various motor driven punches have heretofore been used. However, in most such punches, the paper is stacked horizontally (as contrasted with the vertical stack of the present invention). Further, the batches of sheets are segregated by means of a knife or other instrument which cuts into the top of the stack and lifts a batch of sheets into the punching mechanism. Such punches are generally undesirable because of their expense and problems with operation. Existing machines usually have difficulty punching sheets of mixed thicknesses (e.g. covers and inside pages) or sheets folded into signatures.

The present invention is characterized by the fact that the stack is vertical and that no knife is used to segregate a batch of sheets for punching.

SUMMARY OF THE INVENTION

As has been explained, one of the features of the invention is the fact that the stack is handled in vertical position. The stack is jogged to segregate out of the stack a batch of a thickness which the punch will accommodate. Thus, no knife is required to separate the batch from the stack.

After a batch has been segregated, jaws grip the top edge of the batch, lift the same and insert it into a slot, then lower the batch down the slot until the lower edges of the sheets rest on the bottom of the punch. The punch pins then reciprocate horizontally punching a series of holes distributed along the bottom edge of the sheets.

While the first batch is being punched, the second batch of sheets is being segregated. On the next cycle of the machine, one set of jaws grips the first batch and another set the second batch, lifting each batch upward and rearwardly. The first batch is inserted in a slide which conducts the punched sheets to a discharge tray while the second batch is lowered into the punch.

Timing of the sequence of operations is, in the preferred embodiment hereinafter described, accomplished by a timing shaft containing a plurality of cams. However, it will be understood that other means for timing the sequence may be used.

The cycle is repeated until the entire stack has been punched.

One of the features of the invention is the fact that "signatures" of sheets of the type used in commercial book printing may be punched, each signature being handled in the same manner as a batch of sheets.

Accordingly, the present invention eliminates what has heretofore been a complicated series of hand operations.

Other objects of the present invention will become apparent upon reading the following specification and referring to the accompanying drawings in which similar characters of reference represent corresponding parts in each of the several views.

In the drawings:

FIG. 2 is a sectional view taken substantially along line 2—2 of FIG. 1;

FIG. 3 is a fragmentary view of a portion of FIG. 2 in a different position the cycle of the machine;

FIG. 4 is a section through the punch taken substantially along line 4—4 of FIG. 1;

Figure 1:
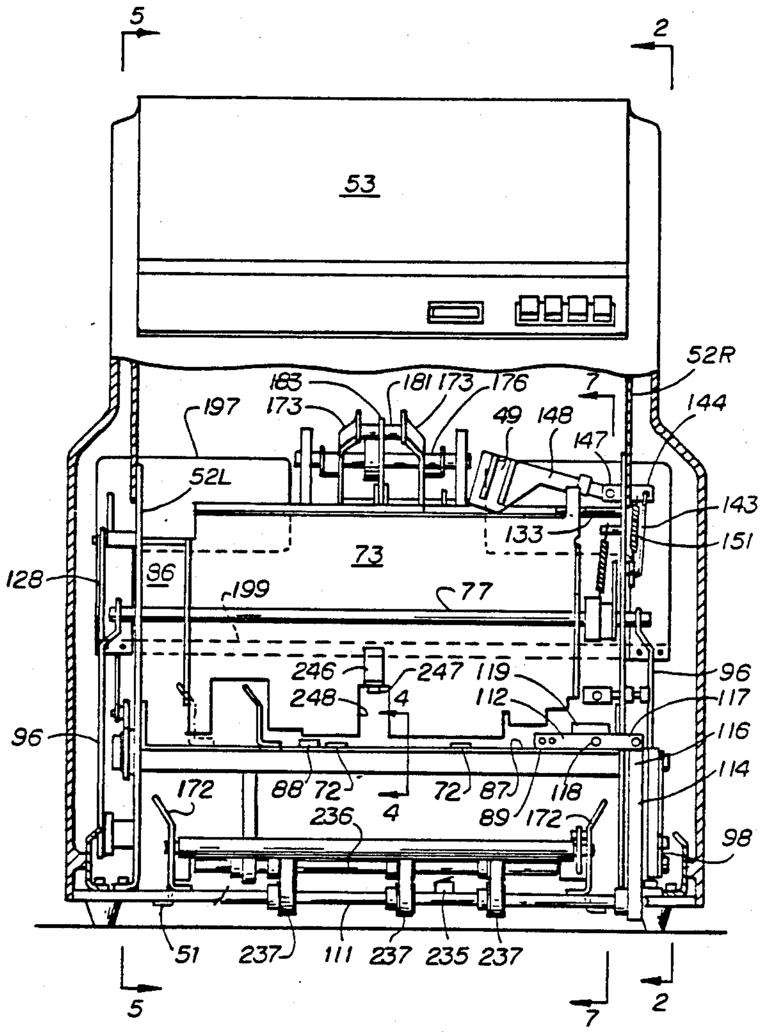
FIG. 1 is a front elevation of the machine with the casing and drawer removed.
Figure 5B:
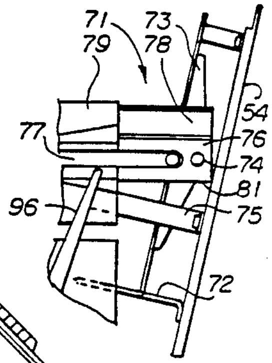
Figure 5:
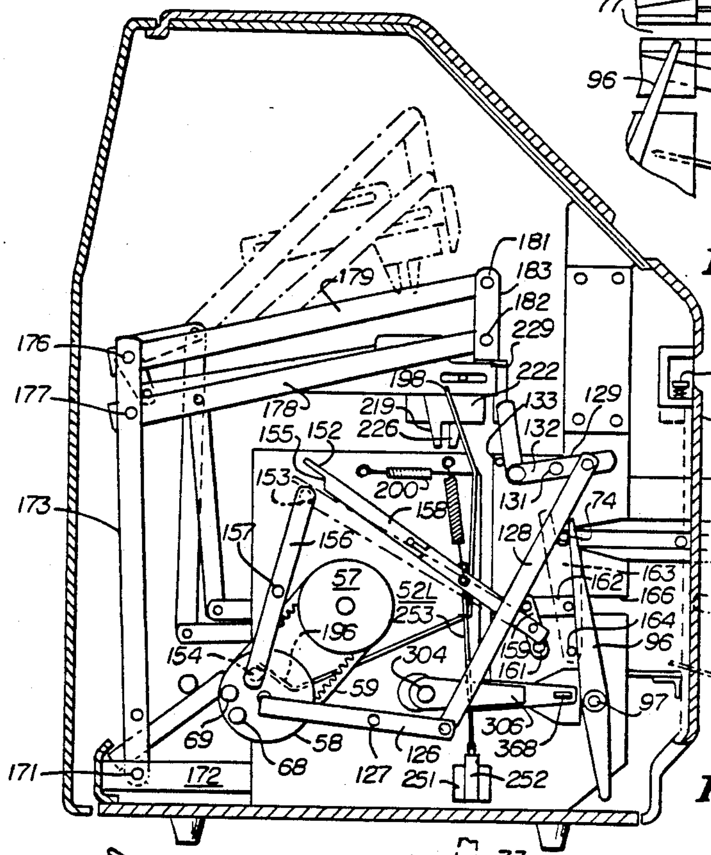
Figure 5A:
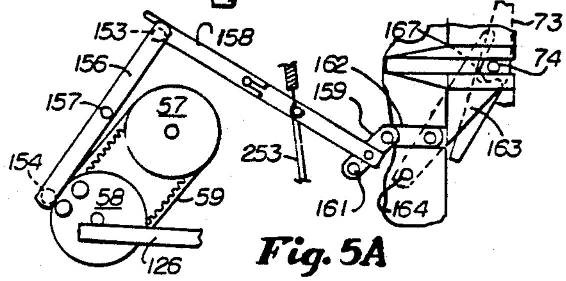
Figure 5C:
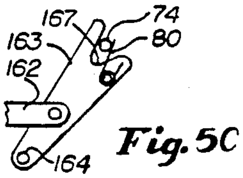

FIG. **4*a* is a fragmentary plan view of the structure of FIG. 4** partially broken away to reveal internal construction;

FIG. 5 a sectional view taken substantially along line 5—5 of FIG. 1;

FIG. 5A is a fragmentary view of a portion of the structure of FIG. 5 shown in a different position in the cycle of operation of the machine;

FIG. 5B is a fragmentary view of a portion of the structure of FIG. 5 different position in said cycle;

FIG. 5C is a fragmentary elevation of a portion of FIG. 5A.

Figure 6:
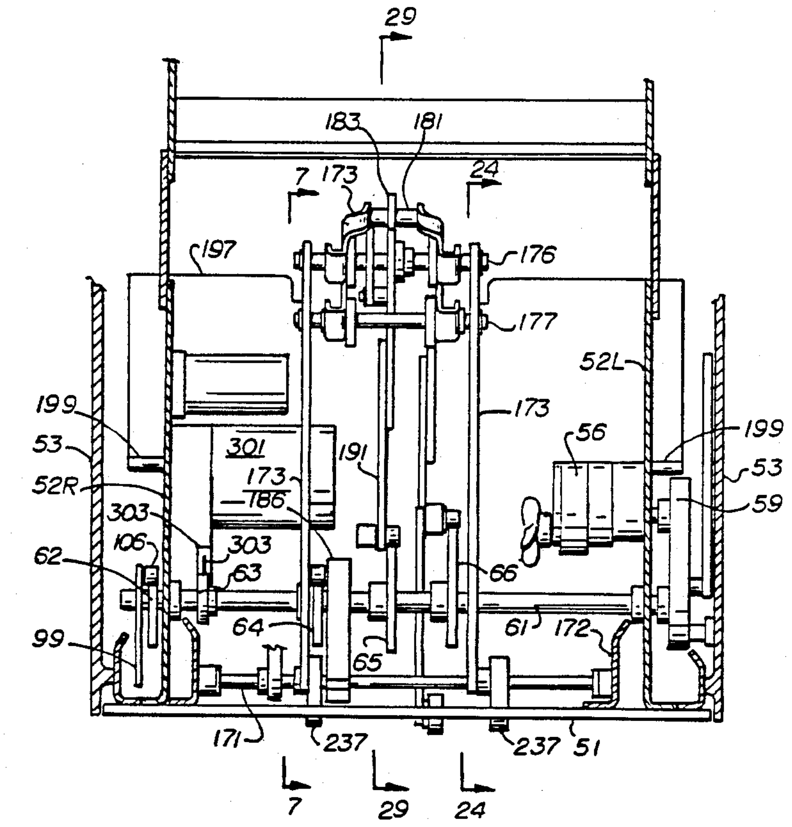
Figure 7:
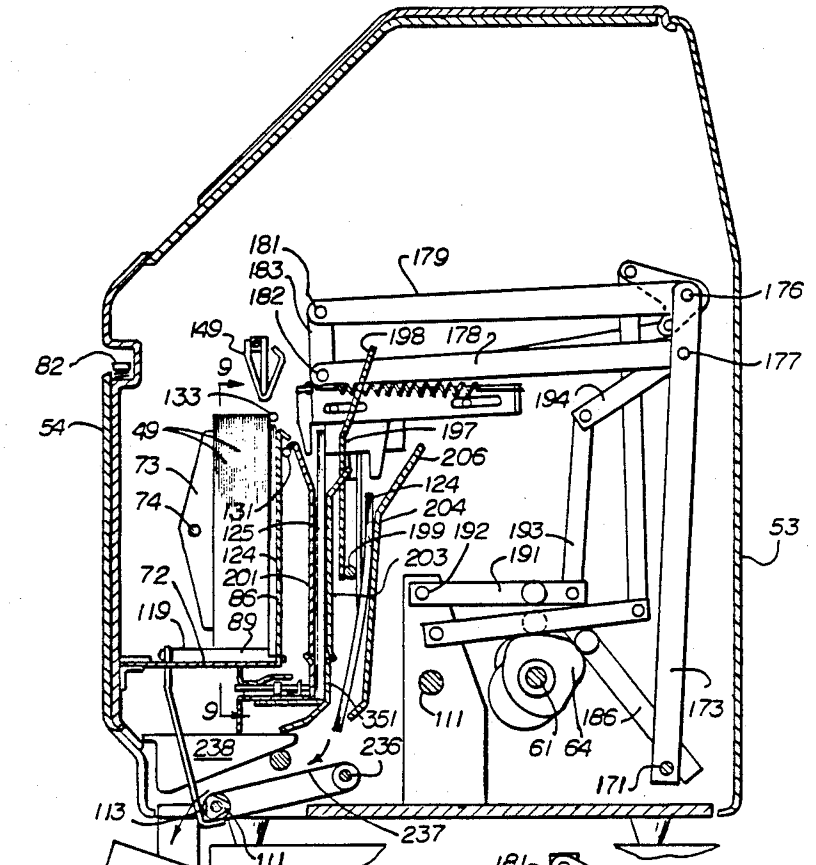
Figure 8:
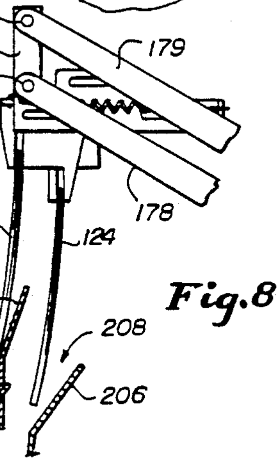
Figure 10A:
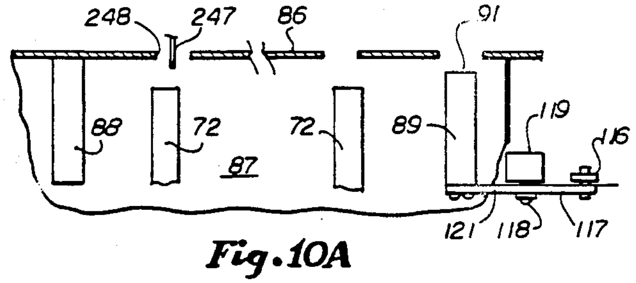
Figure 10:
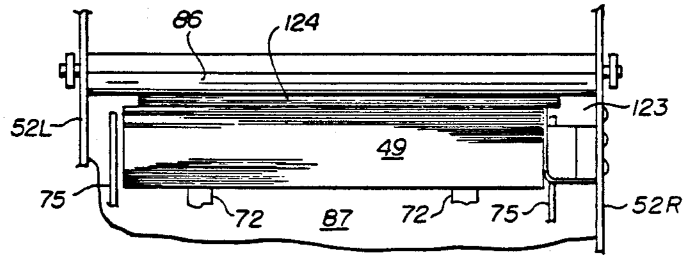
Figure 9:
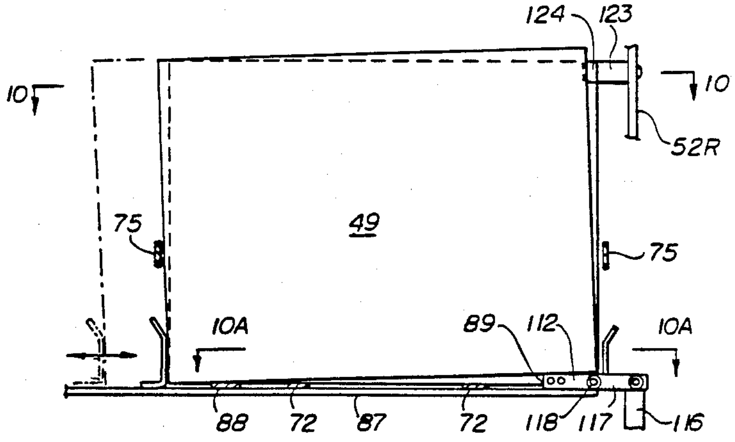
Figure 11:
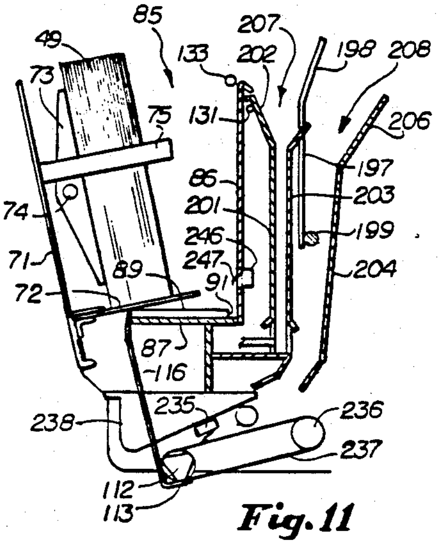
Figure 12:
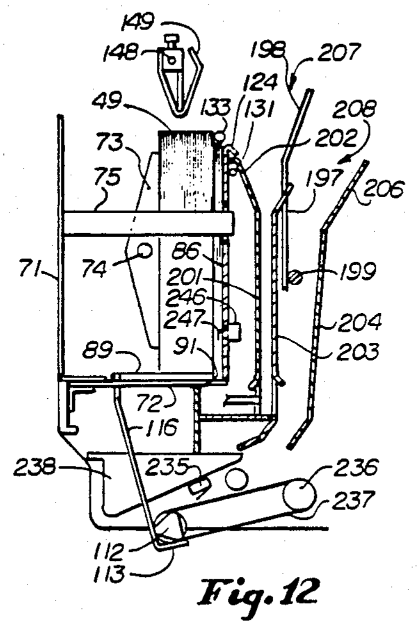
Figure 13:
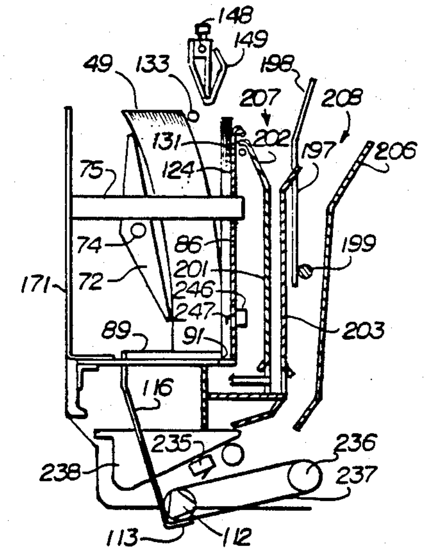
Figure 14:
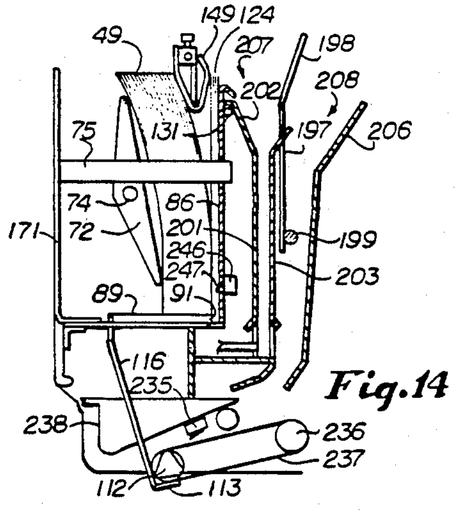
Figure 15:
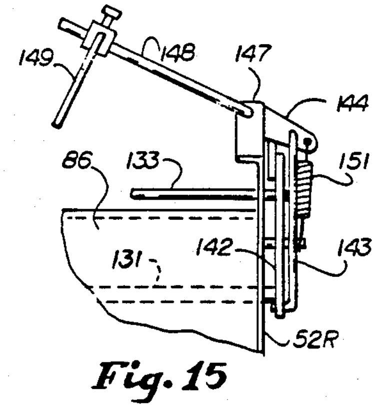
Figure 16:
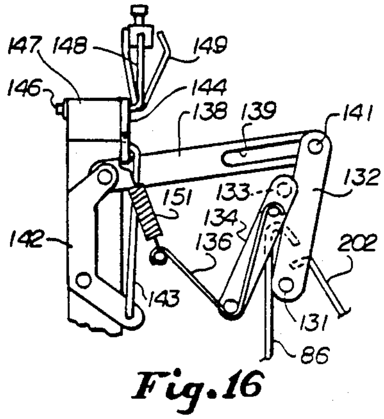
Figure 17:
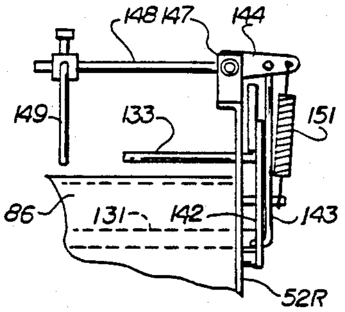
Figure 18:
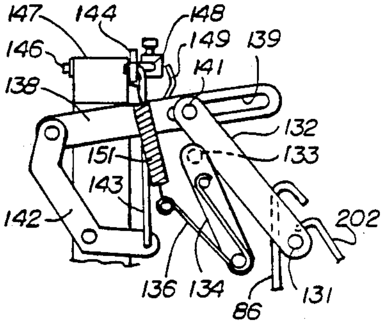
Figure 19:
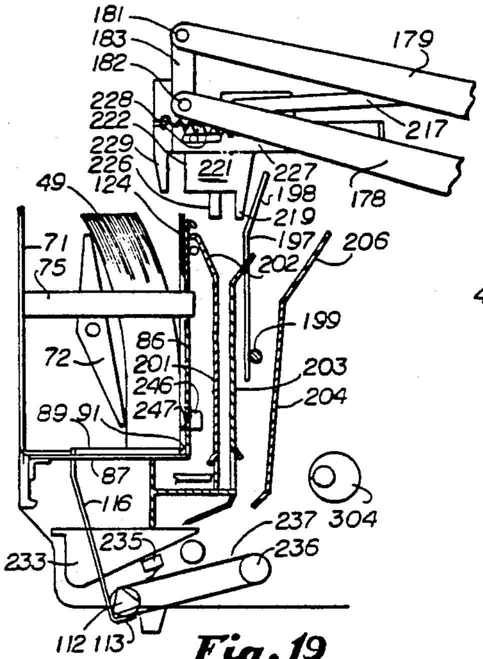
Figure 20:
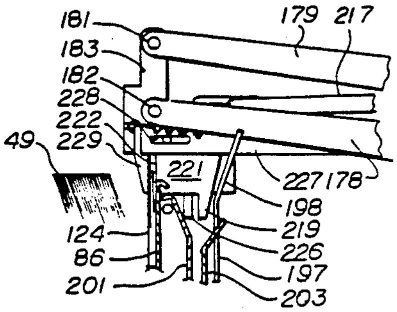
Figure 24:
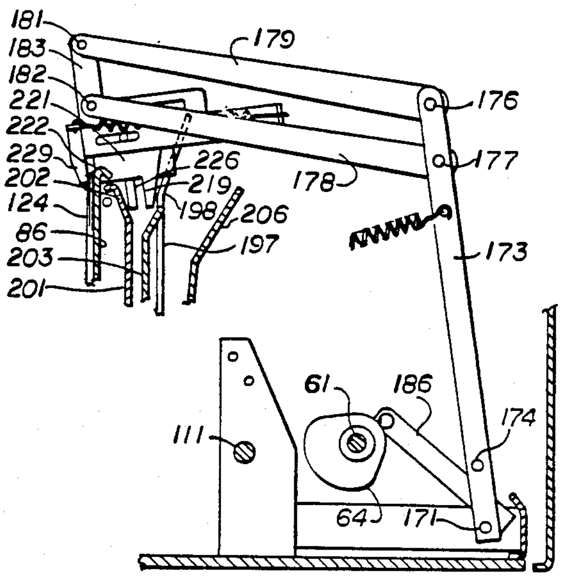
Figure 25:
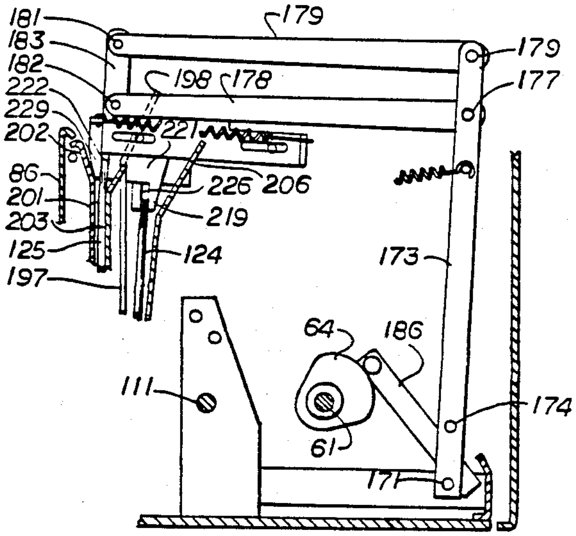
Figure 26:
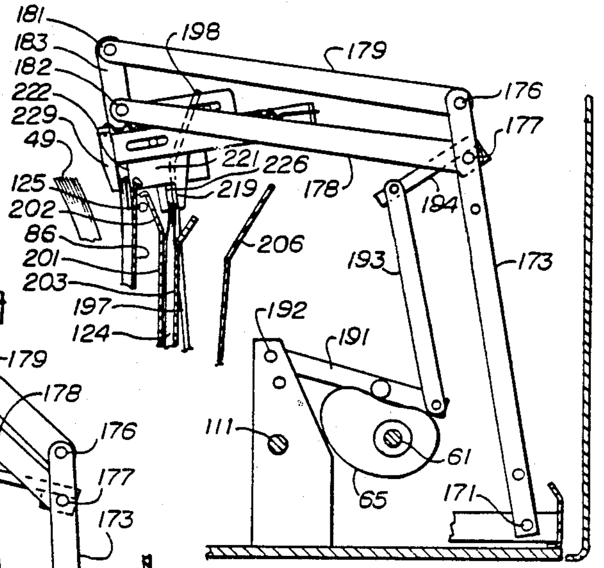
Figure 27:
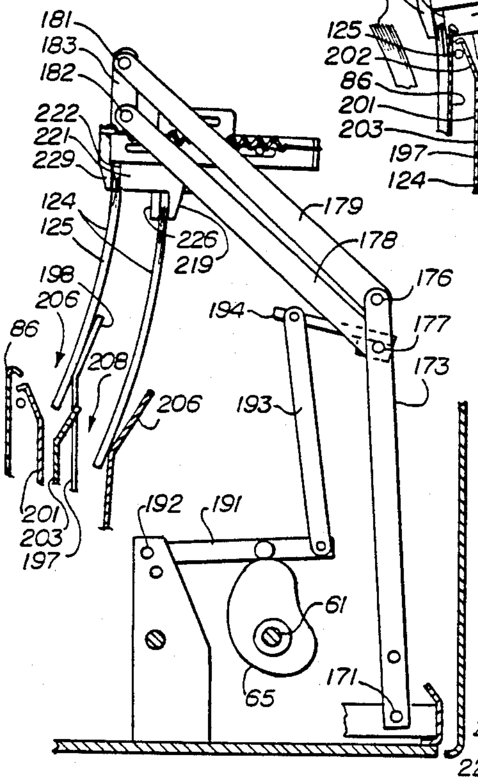
Figure 28:
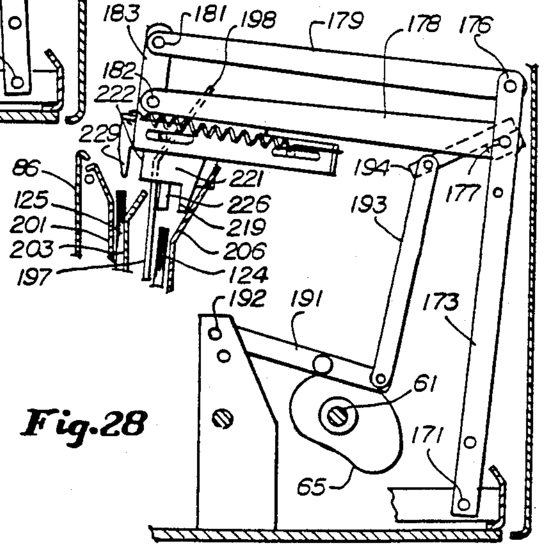
Figure 29:
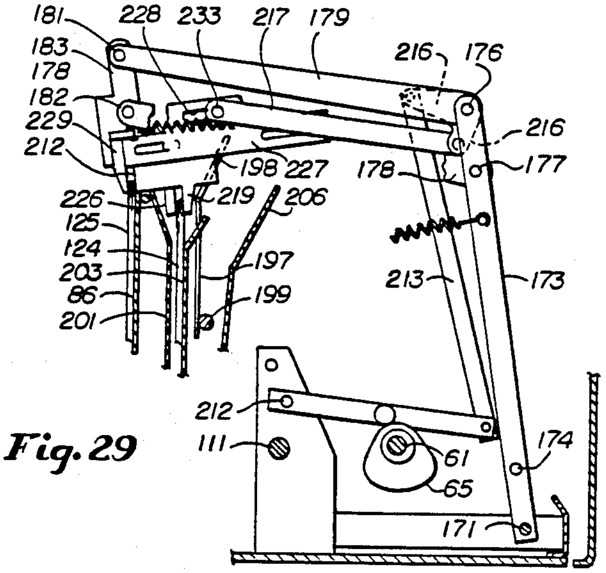
Figure 31:
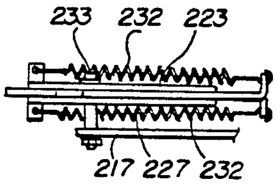
Figure 30:
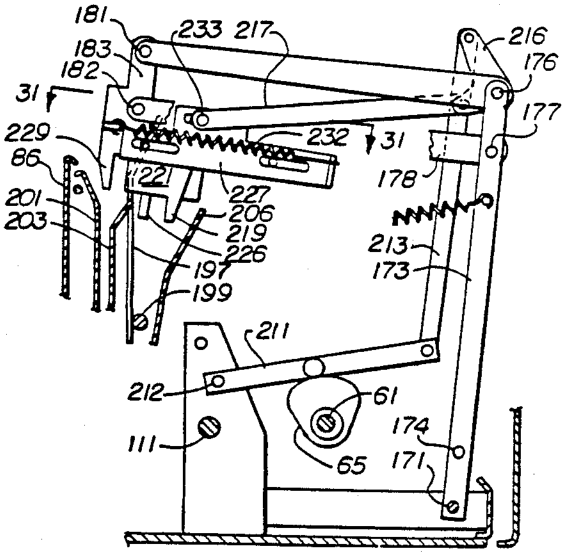

FIG. 6 is a rear elevation with certain parts omitted for clarity;

FIG. 7 is a sectional view taken substantially along line 7—7 of FIG. 1;

FIG. 8 fragmentary view of a portion of FIG. 7 in a different position in the cycle of the machine;

FIG. 9 view taken substantially along the line 9—9 of FIG. 7;

FIG. 10 is a plan view of the structure of FIG. 9;

FIG. 10A is a sectional view taken substantially along line 10A—10A of FIG. 9;

FIGS. 11–14 are schematic views showing stages in the cycle of loading, jogging and segregation of a batch of sheets;

FIG. 15 is an enlarged front elevation of the segregating mechanisms;

FIG. 16 is a side elevation of the structure of FIG. 15;

FIGS. 17 and 18 are views of the structure of FIGS. 15 and 16, respectively, in a different position in the cycle of the machine;

FIG. 19 is a schematic view of the batch gripping mechanism;

FIGS. 20–23 are views similar to FIG. 19 at different positions in the cycle of the machine;

FIG. 24 is a schematic view of the gripper lifting mechanism;

FIG. 25 is a view similar to FIG. 24 in a different position in the cycle of the machine;

FIG. 26 is a schematic view of the gripper longitudinal movement mechanism;

FIGS. 27 and 28 are views similar to FIG. 26 in different positions in the cycle of the machine;

FIG. 29 is a schematic view of the gripper jaw actuating mechanism;

FIG. 30 is a view similar to FIG. 29 in a different position in the cycle of the machine;

FIG. 31 is a top plan view of a portion of FIG. 29.

DESCRIPTION OF PREFERRED EMBODIMENT

Frame & Timing

The function of the machine hereinafter described is to punch holes along a marginal edge in a stack 49 of sheets. The size and spacing of the holes is subject to considerable modification. However, in the preferred embodiment the holes are intended for binding the sheets into a book using binding strips such as are shown in U.S. Pat. No. 4, 369,013.

The frame of the machine has a base 51 from which extend upwardly sides 52R and 52L. It will be understood that for convenience in describing the machine, the front of the machine is as viewed from the left in FIG. 2. The righthand side of the machine is the righthand side of FIG. 1 and the lefthand side of the machine is the lefthand side of FIG. 1. The term "advance" in describing any mechanism or paper path is from the front toward the rear and the term "retract" is in the opposite direction.

Enclosing the frame of the machine is a casing 53 which has a door 54 in the front which opens forwardly. Supported by the frame is a main motor 56 which, through a gear reduction, turns a drive pulley 57 which drives a driven pulley 58 through belt 59. Driven pulley 58 turns timing shaft 61 which extends horizontally transversely across the machine above the base 51 and adjacent the rear of the machine. In the embodiment illustrated and hereinafter described, the timing of the mechanisms is accomplished by a series of cams on shaft 61, the cam followers of which cause pivotal movement of various levers as hereinafter described. It will be understood, however that other timing means may be employed, such as electronic timing means. Further, instead of cams and levers, solenoids, electric motors, pneumatic or hydraulic means, and others might be used to perform the various mechanical functions of the parts illustrated and described.

Controlled by timing and actuating shaft 61 are eight cams. First cam 62 advances the paper pusher support. Second cam 63 starts the single cycle punch motor and also stops the motor when the gripping mechanism is at the top of its movement. Third cam 64 controls forward and rearward movement of the levers which advance the paper. Fourth cam 65 opens and closes the jaws carried by the levers to grip segregated batches of paper. Fifth cam 66 raises and lowers the aforesaid levers. Sixth cam 67 controls the swinging paper guide. Seventh cam 68 controls movement of the paper retractor and eighth cam 69 controls the paper pusher support retractor. The mechanisms whereby these cams perform their various functions is hereinafter described in detail.

Stack Loading

Attached to the inside of door 54 is drawer 71 which is normally vertically disposed and has on its lower edges rearward extending supports 72 for the bottom of the stack. There are also side supports 75 for the stack which are fixed to the drawer 71. Within the drawer 71 is a paper advance 73 which is mounted at about half way of its height on a pivot shaft 74 which extends horizontally across the drawer 71 and projects outward on either side thereof into slots 77 in slide extensions 76. Slide extensions 76 are fixed to door slides 78 which are in turn received in stationary door slides 79 fixed relative to sides 52R and L. Hinge 81 hinges drawer 71 to slide 78. Latch 82 latches the drawer 71 to the casing 53.

To load the stack 49 into the drawer 71, latch 82 is opened, the drawer is pulled forward, slide 78 sliding in slide 79. When the drawer is open, it is tilted upwardly forwardly to the position of FIG. 11. The advancer 73 is pivotted parallel to the drawer 71 about shaft 74.

When the paper stack 49 is in place resting between side supports 75 and on bottom supports 72, the drawer 71 is tilted to upright position and pushed rearward into receptor 85. On the forward side of the machine is a vertical receptor back 86 which limits forward movement of the stack 49 and there is also a horizontal receptor floor 87 above which the supports 72 slide. On the left side of floor 87 is a fixed support 88. On the right side of floor 87 is a movable right support 89 which has a rear terminus 91 spaced forward of back 86 a distance which determines the quantity of sheets which are segregated out of the stack 49 as a batch 124 of sheets to be punched. The segregation of a batch 124 (e.g. 25) is continued until the entire stack 49 has been punched, whereupon the cycle of operation of the machine is discontinued and the drawer 71 is opened.

Mounted on either side of the machine is a advancer lever 96 which is pivotted about horizontal transverse pivot shaft 97. Reciprocating longitudinally of the machine on the bottom of the right side are first horizontal link 98 and parallel adjacent second horizontal link 99. Link 99 is formed with a pair of longitudinally spaced horizontal slots 101. Pins 102 fixed to link 98 extend into slot 101 and the links 98, 99 are biased in opposite directions by spring 103. The use of slots 101 and pins 102 permits accommodation of the movement of the lever 96 dependent upon the quantity of paper in the stack 49. Link 99 has an upward extension 104 having roller 106 bearing against cam 62.

Thus, cam 62 causes the advancer 73 to move stack 49 rearward against back 86 as jogging of the stack commences.

Jogger & Batch Segregator

Extending transversely of the machine at the bottom front corner thereof is a shaft 111 which is turned by the punch motor as hereinafter explained. On the right end of shaft 111 is a jogging cam 112, here shown as a triangular member which is engaged by a follower 113, the latter being held in engagement by spring 114. Follower 112 has an upward extension 116 which is pivotally connected to arm 117 projecting from longitudinal shaft 118 received in a pillow block 119 in the upper righthand corner of the machine. An extension 112 of shaft 118 is received in righthand support 89. Hence, as shaft 111 turns, the stack 49, held against receptor back 86 with a controlled amount of pressure, is jogged. Since the righthand support 89 is higher than the left support 88 and since the terminus 91 of support 89 is spaced forward of receptor back 86, the jogging movement causes a predetermined quantity of sheets from the stack 49 to pivot down to the right as best shown in FIG. 9. The upper edge of the balance of the stack 49 is at a higher elevation than the particular batch of sheets which has been jogged and turned downwardly between the terminus 91 and the receptor back 86. (See FIG. 9).

Fixed adjacent the top righthand corner of receptor back 86 is a stabilizer 123 which keeps the segregated batch of sheets from falling forward.

On the left side of the machine adjacent the back thereof is a cam-follower 126 which is engaged at a certain stage in the rotation of the pulley 58 by the seventh cam 68. Follower 126 is pivotted by pivot 127 to the left side 52L. The opposite end of follower 126 is pivotally connected to link 128 which is, in turn, pivotted to crank 129 extending from transverse horizontal shaft 131 adjacent the top front corner of the machine. On the opposite, or righthand side of shaft 131, is an arm 132 which contacts and pushes forward crank 134 pivotted to the side 52R. Extending upward of crank 134 is paper retractor pin 133. The elevation of pins 133 is below the elevation of the stack 49 which has not been tilted into the stabilizer 123, but is above the elevation of the stabilizer 123 and the first batch of sheets which is held therein. Thus, as cam 68 turns, the pin 133 is moved forward and pushes the balance of the stack which is not within the gauge 123 forwardly against the force of return spring 136.

Link 138 is formed with an elongated lost motion slot 139 in which is received pin 141 on arm 132. See FIGS. 15–18. After the pin 133 has had time to retract all the paper on the right upper corner of stack 49 which has not been segregated into stabilizer 123, pin 141 reaches the end of slot 139 and thus causes rocker arm 142 to pivot, raising link 143 and thereby pivotting crank 144 and shaft 146 connected thereto. Shaft 146 is received in pillow block 147 and at its opposite end has an arm 148 on the outer end of which is a finger 149. Thus, after the paper has been retracted, the finger 149 is dropped between batch 124 and the remainder of the stack about half way between the sides of the stack, thereby holding the stack 49 in retracted position until the segregated batch 124 of sheets can be gripped by jaws thereinafter described and removed from the receptor 85.

Arms 163 pivotted to the inner sides of sides 52L and R on either side of the machine have a clevis 167 which receives pivot shaft 74 with a loose fit. Springs 80 on arms 163 bias shaft 74 and advancer 73 rearward. However, when pin 133 and finger 149 move stack 49 forward, springs 80 flex, permitting such retractive movement.

When stack 49 is exhausted, switch 246 opens, energizing a timer which permits the punch to operate until the last batch 124 has been punched and discharged. Thus, if switch 235 does not sense discharge of a batch 124 from the machine within a predetermined time (e.g., three seconds), solenoid 257 on the left side of the machine (see FIG. 5) is energized, depressing its plunger 252. Link 253 attached to plunger 252 pulls lever 158 down. Lever 158 is pivotted at its forward end to link 159 which is pivotted at its forward end to transverse horizontal pivot 161. The rearward end of lever 158 is formed with cam 152 which engages follower 153 and a shoulder 155 on the upper end of lever 156 which is pivotted by pivot 157 to side 52L. The lower end of lever 156 has a follower 154 which normally is out of the path of cam 69 on pulley 58.

When solenoid 251 is energized, follower 154 is lowered into the path of cam 69. Cam 69 pushes follower 156 clockwise, follower 153 engaging shoulder 155, forcing lever 158 forward, pivotting link 159 and shaft 161 clockwise. Arms 159 on either side of the machine are pivotted at their outer ends to link 162 which is in turn pivotted to retractor arm 163, the lower end of which is pivotted by pivot 164 to the sides 52 L, R. Arcuate slots 166 in sides 52L and R permit connection of pivot 164 to the arms 163 which are on the inner sides of members 52. Thus, in timed sequence to the rotation of timing shaft 61, the arms 163 push against the shaft 74 and retract the advancer 73, thereby permitting retractive movement of pin 133 and providing sufficient space for finger 149 to be depressed into the space between the stack 49 and the segregated batch 124.

Guides for Paper

Preliminary to further description of the function of arms 178 and 179, a description of the vertical members which guide segregated batches of paper is desirable. Thus, spaced rearward of receptor back 86 is punch slot 207. Forward guide member 201 which has a forward bent upper end 202 which is in contact with the upper end of back 86 forms the forward side of slot 207. Rearward of guide 201 is punch slot rear guide 203. Batches 124 deposited in slot 207 between guides 201 and 203 as hereinafter explained are directed to the punch and are then lifted from the punch for discharge. Rearward of guide 203 is discharge slot 208. Rear guide 204 which has a rearward bent upper end 206 and swinging guide 197 define slot 208. Punched paper removed from slot 207 is deposited in slot 208 in front of guide 204 for discharge as hereinafter explained.

There is, in the preferred embodiment of the machine, a swinging guide 197 which is intermediate guides 203 and 204. Guide 197 has a rearward bent upper end 198 and is pivotted on transverse horizontal shaft 198 and biased forwardly by spring 200. The swinging movement of guide 197 is controlled by cam 67. Thus, a follower 196 is controlled by cam 67 and is attached to the guide 197. Turning movement of timing shaft 61 causes the swinging guide to move from a rearward position when batches 124 are being inserted in the slot 207 and to move to a forward position when batches 124 are being deposited in discharge slot 208.

Batch Lifting and Gripping

In the lower rear corner of the machine is transverse horizontal shaft 171 which is journaled in rearward extensions 172 of the sides 52R, 52L. Fixed to and extending upwardly from shaft 171 are parallel, generally vertically extending arms 173 which are connected together by transverse tie 174 near their lower ends. Supported by the upper ends of arms 173 are horizontal transverse upper shaft 176 and intermediate shaft 177. Fixed for rotation to shaft 177 is forward extending lower arm 178 and generally parallel thereto is forward extending arm 179 fixed at its rear end to shaft 176. At the forward end of lower arms 178 is transverse horizontal outer lower shaft 182 and, at the forward ends of arms 179; is outer upper shaft 181. The shafts 181 and 182 are interconnected by vertical link 183.

Forward and rearward movement of the arms 178 and 179 is controlled by cam 64. FIGS. 24–35. Cam-follower 186 is fixed to shaft 171. Thus, as cam 64 turns, follower 186 causes pivotal movement of shaft 171, which is transmitted to the arms 173 fixed thereto, thereby causing forward and rearward movement of arms 178 and 179.

Upward and lowering movement of the arms 178 and 179 is controlled by cam 65. FIGS. 26–28. Follower 191 is pivotted forwardly of timing shaft 61 by pivot 192 attached to the frame of the machine. The rearward end of follower 191 is connected by link 193 to arm 194 which is fixed to shaft 177. Hence, as cam 65 turns, shaft 177 is turned causing oscillatory up and down movement of the arms 178, 179.

Cam 65 on shaft 61 controls the opening and closing of jaws which grip batches of paper to transport the same from the receptor 85 to the punch slot 207 and then to the discharge slot 208. FIGS. 29–31. Cam-follower 211 is controlled by cam 65 and is pivotted forwardly at pivot 212 to a stationary portion of the machine. At the opposite end of follower 211 is a link 213 which is pivotally connected to arm 214 fixed to shaft 176. Another arm 216 also fixed to shaft 176 is pivotally connected to a forwardly extending link 217.

Link 183 at the forward ends of arms 178 and 179 has a rearward extension 251. A vertical rear first jaw grip 212 depends from extension 251 and a rear second jaw grip 219 likewise depends therefrom. Reciprocating alongside extension 221 is left jaw member 223 which is formed with longitudinally extending slots 224. Depending from member 223 is forward second jaw grip 226. On the opposite side of extension 221 and reciprocating parallel thereto is right jaw member 227 also formed with slots 228. Depending from member 227 is forward first jaw grip 229. Transverse pins 231 extend through slots in the members 221, 223 and 227 to hold the same in parallel relationship. Springs 232 connected between extension 221 and the members 223 and 227 bias the members 223 and 227 rearwardly. On the forward end of link 217 is a pin 233 which reciprocates in the slots 224 and 228.

The jaws open and close in timed relation to the movement of arms 178 and 179. Normally, springs 232 bias the jaw members 222 and 229 in closed position and also bias the members 219 and 226 in closed position. Variations in thickness of batches 124 is accommodated by reason of the fact that flexible springs 232 rather than positive mechanical movement close the jaws. As the cam 65 turns, shaft 176 is oscillated causing the link 217 to move forwardly and to move the pin 233 to the forward end of slots 228 causing the jaw members 223 and 227 to move forward relative to extension 221 and open the jaws.

Punch Mechanism

The punch hereinafter described and illustrated herein is an adaptation of that punch shown in U.S. Pat. No. 4,079,647. It will be understood that the structure of the punch is subject to considerable variation. One of the important features of the invention is the fact that the punch reciprocates horizontally and the sheets being punched are disposed substantially vertically as contrasted with common motor-driven punches wherein the paper is horizontal and the reciprocation of the punch mechanism is vertical.

Mounted on the frame of the machine is an electric motor and gear reduction 301 which is of one cycle duration. The motor is controlled by a cam 63 which controls arm 302 of switch 303 so that for each rotation of shaft 61 the motor is actuated once. The motor turns shaft 236 which has an eccentric pin 304 fixed thereto received in connecting rod 306 on either side of the machine.

It will also be understood that the motor drives shaft 111 which controls the jogging mechanism and also controls the belts 237 which discharge the paper from the discharge slot 208 after the punched sheets have been deposited therein.

Extending vertically transversely of the machine is female die plate 351 which is a vertical extension of member 203 partially defining slot 207, the outer ends of plate 351 being secured to sides 52R and 52L. Holes 352 are formed in plate 351, the number and location thereof depending upon the holes to be punched in the sheets. The rearward edge of plate 351 is bent horizontally in a stretch 360 which serves as a stop, limiting inward insertion of the batch 124. The distance between stop 360 and holes 352 determines the distance from the marginal edge of the sheets at which the holes are punched. Immediately forwardly of plate 351 is a vertical transverse guide plate 353 which is an extension of member 201 and there is a gap 355 between plates 351 and 353 which limits the quantity of sheets which may be punched at one time. Plate 353 is formed with holes 354 which are horizontally aligned with holes 352.

Horizontally reciprocating punch plate 356 is in alignment with the holes 352 and 354 and is spaced therefrom by spacer 357. Pins 359 pass through holes in the edges of plates 351, 354. The pins 359 pass through elongated slots 361 in plate 356 so that the plate 356 may reciprocate relative to the stationary elements of the apparatus. An L-shaped secondary guide 362 is fixed to the face of the turned portion of plate 353 and is also apertured in alignment with apertures 352,354.

Male punches 363 which are in the form of round cross-section pins are in alignment with holes 353. The lower ends of pins 363 are ground concave so as to cooperate with holes 352 to punch paper in the gap 355. The outer end of each pin 363 is formed with an enlarged head 364 which is received in a slot 366 in punch-plate 356. Below slots 366 are inward extending shoulders 369 formed integral in plates 356 which engage under the heads 364. Thus, as the plate 356 is moved, each head 364 of pins 363 is depressed by the top of slot 366 engaging the head of 364.

Actuation of the reciprocation of punch plate 356 is accomplished by oscillation of punch connecting rod 306. It will be noted that plate 356 has outward extensions 367 at either end which project through slots in sides 52R and L and have ears 368 which are received in a hole in the forward end of connecting rod 306.

As shown in FIG. 7, the punch motor 301 turns transverse horizontal shaft 236 which carries pulleys connected by a series of belts 237 to pulleys on shaft 111. Batches 124, 125 deposited in discharge slot 208 contact belts 237 and are moved forward, the batches being deposited in tray 238 and resting on bottom 239 until a stack 49 of punched paper equivalent to initial stack 49 is built up.

Operation

At the commencement of operation, the arms 178, 179 are in elevated and retracted position and the jaw members 225 and 227 are open (see FIG. 5).

Drawer 71 is empty and advancer 73 is fully forward. The operator unlatches latch 82 and pulls the drawer 71 forward, and then tilts the drawer so that it extends upwardly forward. A stack 49 is inserted in drawer 71 in front of the advancer 73. The drawer is then closed and latched, advancing the stack into receptor 85.

Stack 49 depresses arm 247, closing switch 246 and energizing motor 56 to turn shaft 61. Cam 67 causes lever 96 to swing forward pushing the shaft 74 forward and forcing the stack 49 against the receptor back 86. At this point in the operation of the machine, cam 63 closes switch 303 and the punch motor 301 causes shaft 111 to turn, which jogs the right support 89 so that a segregated batch 124 of sheets (in other words, the preferred capacity of the punch) is pushed forward in receptor 85 and tilted to the right into the space between the rear terminus 91 of the member 73 and also into the stabilizer 123.

Continued turning of shaft 61 causes cam 62 to relax the force on advancer 73. Cam 68 pushes paper retractor pin 133 forwardly against the force of spring 136 to push the remainder of the stack forwardly and then to lower finger 149 in front of the batch 124 against the force of spring 151. Stabilizer 123 prevents batch 124 from dropping forward while this operation is being performed.

The arms 178, 179 have been moving forwardly and downwardly with the jaws open. Upon reaching the position of FIG. 24, cam 65 causes the jaws to close by the springs 232 pulling the jaw members 223 and 227 rearwardly. Variations in thickness of the batch 124 are accommodated by the spring 232.

Figure 21:
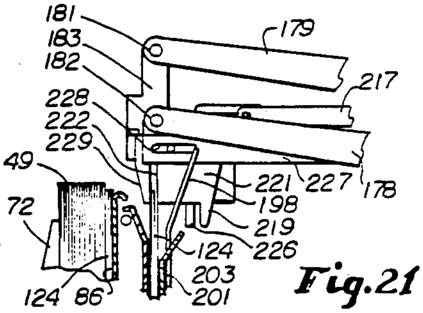
Figure 23:
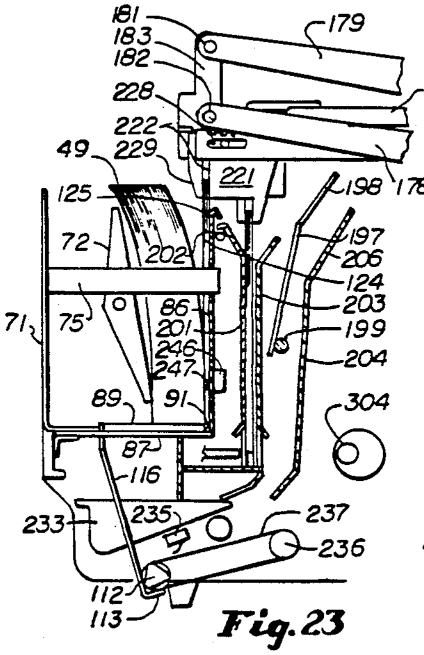
Figure 22:
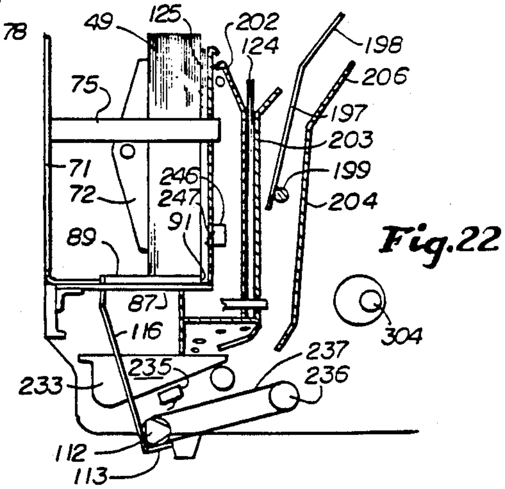

Continued movement of cams 64 and 66 cause the arms 178 and 179 to lift the batch 124 upward and slightly rearward so that the lower end of first batch 124 fits into punch slot 207 (see FIG. 21). At this time, the swinging guide 197 is in its backward position. The batch 124 is lowered to the bottom of the punch slot 207 as shown in FIG. 22. At this point cam 63 energizes the punch motor 301 causing the punch to punch holes in the first batch 124. The debris drops down via the bent lower end 241 of member 197 into debris tray 242 where the debris is collected and may be removed as required. (See FIG. 22)

While the punching of batch 124 continues, the next batch 125 of paper is being segregated in the same manner that the first batch 124 was segregated. Further, the arms 178 and 179 have first moved up and then forward and then down. The jaws then close as shown in the position of Fig. 25 with the forward jaws gripping the second batch 125 of papers and the rear jaws gripping the punched batch 124. The arms 178 and 179 then move to their full up position and move slightly rearward—i.e., from the position of FIG. 29 to the approximate position of FIG. 30. When the mechanism has reached the position of FIG. 30, the jaws are opened by cam 64, causing the second batch of sheets to be released into the punch slot 207 and causing the first batch 124 of sheets to be released into the discharge slot 208 between members 197 and 204, the member 197 now being in forward position.

As the second batch 125 of sheets is being punched, the shaft 236 turns and causes the belt 237 to move the batch 124 which is being discharged downward and forward so that batch 124 drops into the tray 238 as shown in FIG. 7.

The cycle of punching batches is repeated until the entire stack 49 has been punched.

A limit switch 246 is located in front of back 86 and has an arm, 247 which projects forwardly. Advancer 73 is formed with a notch 248 so that only paper in the receptor 85 will hold the switch arm 247 inward (i.e., rearward). When the arm 247 can freely move forwardly it senses that there is no paper in the receptor. Thereupon, the solenoid 251 is energized, causing its plunger 252 to be depressed. Link 253 attached to plunger 252 pulls the lever 158, moving the advance 73 forward to its full open position. The machine then stops.

To resume operation, the drawer 71 must again be opened and a new stack 49 inserted.

What is claimed is:

1. A punch for punching plural sheets comprising a sheet receptor having a rear plate, bottom support means for supporting a stack of said sheets in substantially vertical position, biasing means releasably biasing said stack toward said rear plate, jogging means for jogging said stack, segregating means on said bottom support means for separating from the front of said stack a segregated plurality of sheets of pre-determined thickness, a sheet punch having an upward-facing throat, and first transfer means for transferring said segregated plurality of sheets from said receptor and into said throat and, punch actuating means for actuating said punch when said segregated plurality of sheets is in said throat, second transfer means for transferring punched sheets from said sheet punch to a discharge station.

2. A punch according to claim 1 in which said segregating means comprises a substantially horizontal gauge having a forward end positioned rearward of said rear plate.

3. A punch according to claim 2 which further comprises a stabilizer located laterally from and spaced above said gauge means to receive a portion of the lateral edges of said segregated sheets to restrain rearward movement of said lateral edges.

4. A punch according to claim 1 which further comprises a finger movable between a retracted first position and an operative second position interposed immediately behind the upper edge of said segregated plurality of sheets to provide space for entry of a portion of said first transfer means behind said segregated plurality of sheets.

5. A punch according to claim 4 in which said finger pushes said biasing means rearward when said finger is moving into second position.

6. A punch according to claim 5 which further comprises a retractor movable from an inoperative first position horizontally rearward at the level of the upper edges of said stack behind said segregated sheets to a second position restraining forward movement of said stack when said finger is in second position.

7. A punch according to claim 6 in which said segregating means causes lateral downward movement of at least one upper corner of said segregated sheets so that said one upper corner is below the level of movement of said retractor between first and second positions.

8. A punch according to claim 1 in which said first transfer means comprises a clamp, means for opening and closing said clamp and actuating means for moving said clamp from a retracted first position, to a second position gripping the upper edges of said segregated plurality of sheets when in said receptor, to a third position with said segregated plurality of sheets in said throat, and back to said first position.

9. A punch according to claim 8 in which said second transfer means comprises a vertical chute, a discharge tray below said chute, a second clamp, second means for opening and closing said second clamp, second means for opening and closing said second clamp in timed relation to said first-mentioned means for opening and closing said first-mentioned clamp, and second actuating means for moving said second clamp from a retracted first position, to a second position gripping the upper edges of said segregated plurality of sheets when in said throat, to a third position with said segregated plurality of sheets in said chute and back to said first position.

10. A punch according to claim 9 which further comprises timing means timing movement of said first and second means for opening and closing said first and second clamps, for moving said first transfer means through its cycle of positions and for moving said second transfer means through its cycle of positions and for moving said second transfer means through its cycle of positions.

11. A punch according to claim 1 which further comprises sensing means sensing the exhaustion of sheets in said receptor and retractor means for retracting said biasing means in timed relation to said sensing means sensing exhaustion of sheets in said receptor.

12. A punch according to claim 1 in which said receptor further comprises a drawer, guide means for horizontal movement of said drawer and hinge means on said guide means for pivotting said drawer rearwardly-upwardly to load a stack of sheets into said receptor.

13. A punch according to claim 1 in which said punch means comprises a vertically positioned die formed with a plurality of punch apertures, a plurality of punch pins and means for reciprocating said punch pins horizontally, said die comprising a portion of said throat.

14. A punch for punching plural sheets comprising a sheet receptor having a rear plate, bottom support means for supporting a stack of said sheets on edge, biasing means releasably biasing said stack toward said rear plate, jogging means for jogging said stack, segregating means on said bottom support means for separating from the front of said stack a segregated plurality of sheets of pre-determined thickness, a sheet punch having an upward-facing throat, punch actuating means for actuating said punch when a segergated plurality of sheets is in said throat, and transfer means for transferring said segregated plurality of sheets from said receptor and into said throat, and transferring punched sheets from said sheet punch to a discharge station.

* * * * *